(12) United States Patent
Noguchi et al.

(10) Patent No.: US 7,295,055 B2
(45) Date of Patent: Nov. 13, 2007

(54) DEVICE FOR ELIMINATING CLOCK SIGNAL NOISE IN A SEMICONDUCTOR INTEGRATED CIRCUIT

(75) Inventors: Hidekazu Noguchi, Tokyo (JP); Hidenori Uehara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/216,142

(22) Filed: Sep. 1, 2005

(65) Prior Publication Data
US 2006/0119716 A1 Jun. 8, 2006

(30) Foreign Application Priority Data
Dec. 7, 2004 (JP) ............................. 2004-353560

(51) Int. Cl.
*G06F 1/04* (2006.01)
(52) U.S. Cl. .................. 327/291; 327/294; 327/263
(58) Field of Classification Search ................ 327/291, 327/293, 294, 299, 261, 263, 268, 290
See application file for complete search history.

(56) References Cited

U.S. PATENT DOCUMENTS

| | | | | |
|---|---|---|---|---|
| 5,132,563 A | * | 7/1992 | Fujii et al. ..................... 326/27 |
| 5,537,067 A | * | 7/1996 | Carvajal et al. ............. 327/108 |
| 6,121,813 A | * | 9/2000 | Furuchi ....................... 327/285 |
| 6,225,844 B1 | * | 5/2001 | Fujiwara ..................... 327/170 |
| 6,310,506 B1 | * | 10/2001 | Brown ........................ 327/284 |
| 6,462,597 B2 | * | 10/2002 | Lee ............................. 327/261 |
| 6,650,168 B1 | * | 11/2003 | Wang et al. ................. 327/333 |
| 6,753,707 B2 | * | 6/2004 | Honda et al. ................ 327/108 |

FOREIGN PATENT DOCUMENTS

JP 10-064268 3/1998

* cited by examiner

*Primary Examiner*—Kenneth B. Wells
*Assistant Examiner*—Hai L. Nguyen
(74) *Attorney, Agent, or Firm*—Nixon Peabody LLP; Donald R. Studebaker (57) ABSTRACT

A semiconductor integrated circuit includes a integration circuit which has a first integrating portion and a second integrating portion. The semiconductor integrated circuit also includes a data input portion, data processing portion and data output portion. A clock signal is inverted by an input buffer and applied to a NAND gate together with a mask signal. When the signal from the NAND gate rises, the signal of the second integrating portion falls after a delay time due to the integration circuit. The signal from the NAND gate is applied together with the signal from the second integrating portion to a second NAND gate, and the signal from the second NAND gate is fixed at "L" during the period from the time of the rise of the clock signal for the duration of the delay time of the integration circuit. The signal from the second NAND gate is delayed by a third integrating portion and a delay time of the third integrating portion is added by an AND gate to generate a mask signal. In the meantime, the signal from the second NAND gate is also inverted by an inverter, and is supplied as an internal clock to the data input portion, data processing portion, and data output portion.

15 Claims, 4 Drawing Sheets

PRIOR ART

DEVICE FOR ELIMINATING CLOCK SIGNAL NOISE IN A SEMICONDUCTOR INTEGRATED CIRCUIT

BACKGROUND OF THE INVENTION

1. Field of the Invention

This invention relates to an arrangement for elimination of clock signal noise in a semiconductor integrated circuit.

2. Description of the Related Art

If a semiconductor chip housed in a package should perform signal input/output with external devices, pads on the chip are connected to metal terminals on the package via wires or similar. Due to the resulting parasitic reactance, input/output signals are greatly disturbed, causing fluctuations in the reference potential (ground level) of the semiconductor chip. Particularly when using output data signals to drive external circuits, the large changes occur in power supply current, so that fluctuations in the reference potential are also large, possibly resulting in erroneous operation.

Figure 2:
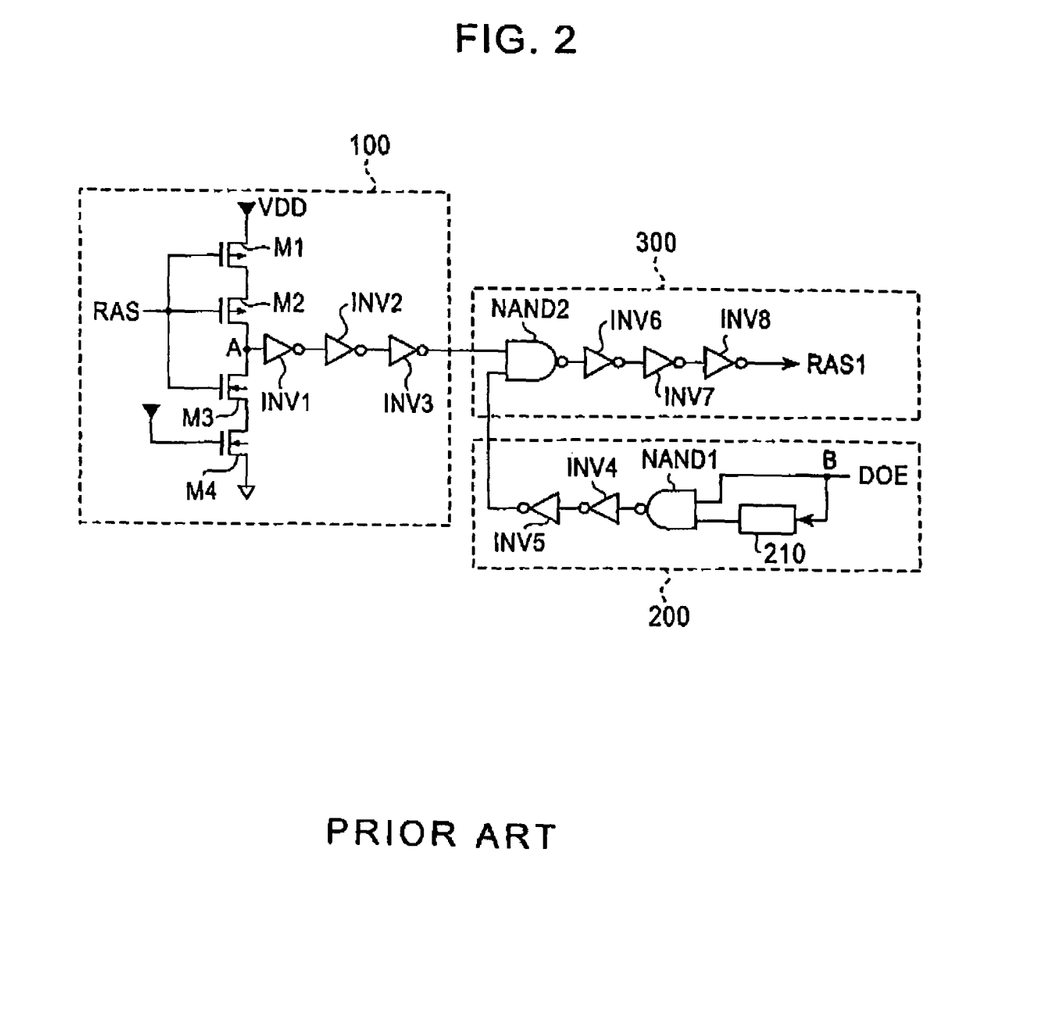
FIG. 2 is a circuit diagram of a conventional input buffer circuit.

FIG. 2 of the accompanying drawings shows a circuit diagram of an input buffer circuit of the prior art. This prior art is disclosed in Japanese Patent Kokai (Laid-open Application) No. 10-64268.

This input buffer circuit is a circuit to prevent erroneous operation due to feedback to the input buffer caused by output noises from a semiconductor memory device. This input buffer circuit has a buffer input portion 100 for input of a RAS (row address strobe) signal from outside, a DOE lock portion 200 for input of a DOE (data output enable) signal from outside and for causing delay of a prescribed length of time, and a buffer output portion 300 for output of the RAS signal applied from the buffer input portion 100 upon the DOE signal supplied, with a delay, from the DOE lock portion 200. Here the DOE signal is provided externally in synchronization with a CAS (column address strobe) signal used when reading data in the memory device.

The buffer input portion 100 includes p-channel MOS (hereafter called "PMOS") transistors M1, M2 and n-channel MOS (hereafter called "NMOS") transistors M3, M4, connected in series to form a CMOS inverter. The buffer input portion 100 also includes inverters INV1, INV2, INV3 cascade-connected to node A which is the output side of the CMOS inverter. The RAS signal is applied to the input side of the CMOS inverter.

The DOE lock portion 200 includes a delay circuit 210 which delays the DOE signal applied from outside by a prescribed amount of time, a NAND gate NAND1 which inverts and outputs the logical product of the DOE signal delayed by the delay circuit 210 and the original DOE signal, and inverters INV4, INV5 cascade-connected to the output of the NAND gate NAND1.

The buffer output portion 300 includes a NAND gate NAND2 which receives the output signal from the inverter INV3 of the buffer input portion 100 and the output signal of the inverter INV5 of the DOE lock portion 200, and inverters INV6, INV7, INV8 cascade-connected to the output of the NAND gate NAND2.

In this input buffer circuit, upon executing a read operation, when the RAS signal goes from "H" (high) to "L" (low), the signal at the node A changes from "L" to "H". At this time, the DOE signal synchronized with the CAS signal is held for a fixed period at "H". Hence the output of the NAND gate NAND2 is determined by the output signal from the inverter INV2. Thereafter, when the DOE signal changes from "L" to "H", the output of the NAND gate NAND1 is held at "L" for the delay time of the delay circuit 210, and then changes to "H".

Sensing noise occurs when the RAS signal changes from "H" to "L", and output noise occurs when the CAS signal changes from "H" to "L"; but during this interval the output of the NAND gate NAND1 is "L", so that the output of the NAND gate NAND2 is held at "H". As a result, during this interval the RAS1 signal issued from the buffer output portion 300 is "L". Therefore, when the RAS signal changes from "H" to "L", erroneous operation of the buffer due to output noise can be prevented.

In order to remove RAS signal noise in the input buffer circuit, a stable DOE signal with no noise must be introduced to the input buffer circuit from outside, in synchronization with the CAS signal. However, if a clock signal is applied from outside, there exists no corresponding DOE signal, and the input buffer circuit cannot eliminate noise occurring in the clock signal. Hence when the clock signal applied from outside rises, operation of the internal circuitry causes the substrate potential to fluctuate, so that noise is superposed on the clock signal and a plurality of clock signals with narrow pulse widths occur.

SUMMARY OF THE INVENTION

One object of this invention is to eliminate disturbance of clock signals arising from operation of a semiconductor integrated circuit.

According to one aspect of the present invention, there is provided a semiconductor integrated circuit that includes an input buffer for capturing and inverting a clock signal provided from outside, and a first gate for inverting the logical product of a mask signal and the output signal from the input buffer. The semiconductor integrated circuit also includes an integrating portion, which, when the output signal from the first gate rises, integrates this output signal with a prescribed time constant. The integrating portion lowers a delay clock when this output signal of the first gate reaches a prescribed level. When the output signal of the first gate falls, this integrating portion immediately raises the delay clock. The semiconductor integrated circuit also includes a second gate, which inverts the logical product of the output signal of the first gate and the delay clock, and outputs the result as the mask signal. The semiconductor integrated circuit also includes an output buffer, which inverts the output signal of the second gate and outputs the result as an internal clock.

As described above, the semiconductor integrated circuit has a first gate, which generates a signal by inverting the logical product of the clock signal captured and inverted by the input buffer and a mask signal. The semiconductor integrated circuit also has an integrating portion which, when this inverted signal is rising, integrates the signal with a prescribed time constant and lowers the delay clock, and when the inverted signal is falling, immediately raises the delay clock. The semiconductor integrated circuit also has a second gate which inverts the logical product of the output signal of this integrating portion and the output signal of the first gate and feeds back the result to the first gate as a mask signal. Thus, while a delay clock is being issued from the integrating portion, the output signal from the first gate is fixed at high level. Accordingly, even if noise is superposed on the clock signal due to fluctuation of the reference potential of the input buffer, an internal clock with noise eliminated can be generated.

The integrating portion may have a PMOS transistor, connected between the power supply potential and a first node. The conducting state of the PMOS transistor may be controlled by the output signal from the previous-stage gate. The integrating portion may also have a resistance, connected between the first node and a second mode. The integrating portion may also have an NMOS transistor, connected between the second node and ground potential, such that the conducting state of the NMOS transistor may be controlled by the same signal as the PMOS transistor. The integrating portion may also have a first capacitor connected between the first node and the power supply potential and a second capacitor connected between the first node and the ground potential. The integrating portion may also have an inverter, which inverts and outputs the signal at the first node. With these elements and configuration, it is possible to reduce fluctuations in the time constant of the integrating circuit due to changes in the power supply voltage and temperature.

Other objects, aspects, advantages and novel features of this invention will become clearer upon reading the following detailed description and appended claims in conjunction with the accompanying drawings. It should be noted that the drawings are used primarily for explanation, and do not limit the scope of the invention.

DETAILED DESCRIPTION OF THE INVENTION

Embodiment 1

Figure 1:
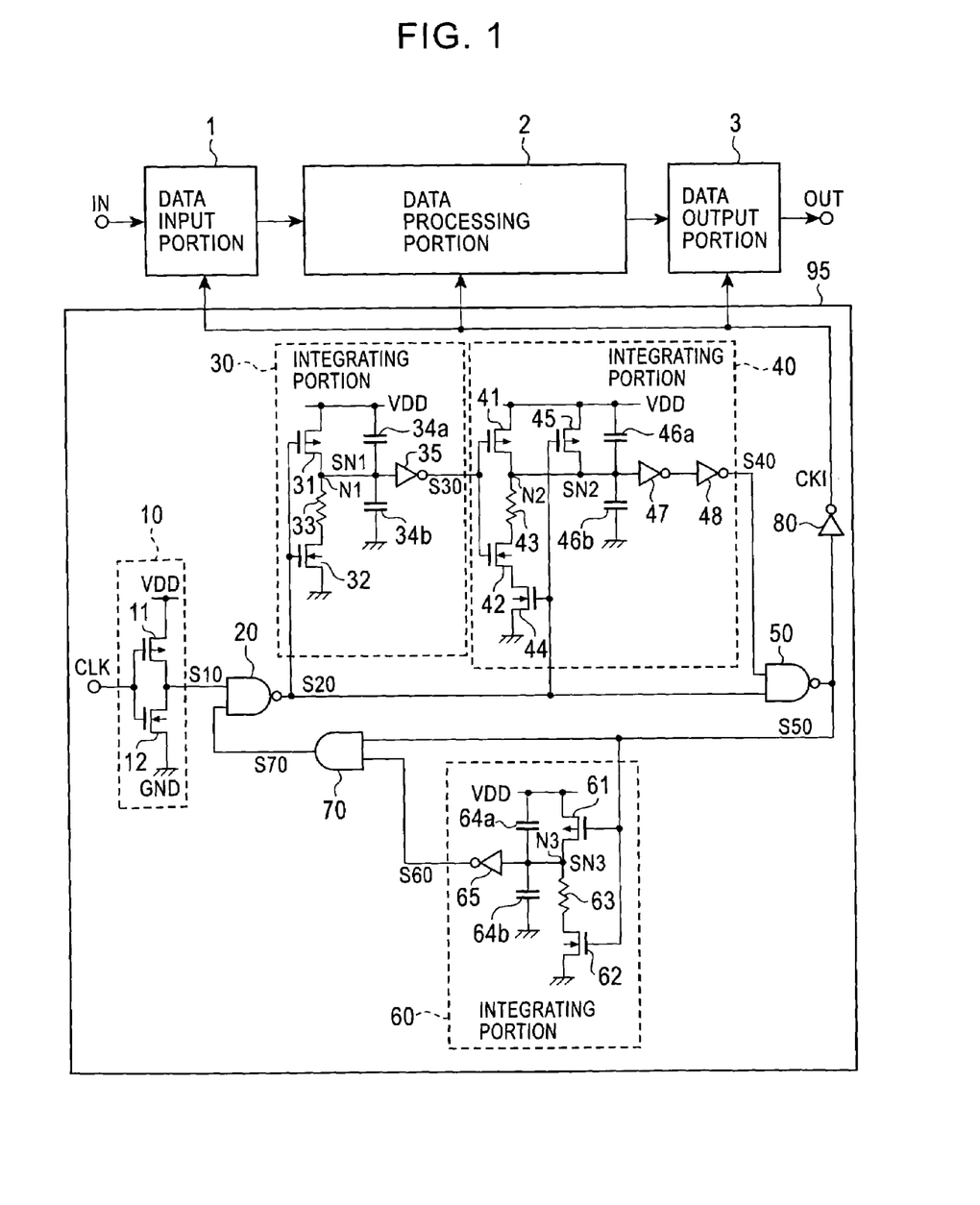
FIG. 1 shows the configuration of the semiconductor integrated circuit of Embodiment 1 of the present invention.

Referring to FIG. 1, the configuration of the semiconductor integrated circuit of Embodiment 1 of the invention will be described.

This semiconductor integrated circuit has a data input portion 1, which captures a plurality of input signals IN in synchronization with an internal clock CKI. The semiconductor integrated circuit also has a data processing portion 2, which processes the data captured by the data input portion 1, in synchronization with the internal clock CKI. The semiconductor integrated circuit also has a data output portion 3, which outputs the processing result of the data processing portion 2 as an output signal OUT, in synchronization with the internal clock CKI. This semiconductor integrated circuit further includes a clock circuit 95 which generates the internal clock CKI, free of noise, from a clock signal CLK provided from outside, and supplies the internal clock CKI to the data input portion 1, data processing portion 2, and data output portion 3.

The clock circuit has an input buffer (for example, a buffer portion 10) which captures a clock signal CLK, for example at 166 MHz, from outside. The clock circuit also has first and second gates (for example, negative logical product (hereafter called "NAND") gates 20, 50). The clock circuit also has a first integrating portion (for example, integrating portions 30 and 40), a second integrating portion (for example, integrating portion 60), a third gate (for example, a logical product (hereafter called "AND") gate 70), and an output buffer (for example, an inverter 80) which outputs the internal clock CKI.

The buffer portion 10 is an ordinary CMOS inverter. The ordinary CMOS inverter has a PMOS transistor 11 and NMOS transistor 12. The signal S10 from this buffer portion 10 is applied to the first input of the NAND gate 20. The signal S20 from the NAND gate 20 is applied to the integrating portions 30 and 40 and to the first input of the NAND gate 50.

The integrating portions 30 and 40 integrate the signal S20 supplied from the NAND gate 20 with prescribed time constants from the time the signal S20 rises. The integrating portions 30 and 40 lower the signal S40 which is the delay clock when the signal S20 reaches the threshold voltage of the inverters 35 and 47, and immediately raises the signal S40 when the signal S20 falls.

The integrating portion 30 has a PMOS transistor 31 and NMOS transistor 32 to the gates of which the signal S20 is applied. The source of the PMOS transistor 31 is connected to the power supply potential VDD, and the drain is connected to the node N1. The source of the NMOS transistor 32 is connected to ground potential GND, and the drain is connected, through a resistance 33, to the node N1. The node N1 is connected to the power supply potential VDD and to ground potential GND through capacitors 34a and 34b respectively, and the signal SN1 of the node N1 is inverted by the inverter 35 and applied, as the signal S30, to the integrating portion 40. The value of the resistance 33 is from 10 to 20 kΩ, and the time constant resulting from this resistance 33 and the capacitors 34a, 34b is set to several ns.

The integrating portion 40 has a PMOS transistor 41 and NMOS transistor 42, to the gates of which the signal S30 is applied. The source of the PMOS transistor 41 is connected to the power supply potential VDD, and the drain is connected to the node N2. The drain of the NMOS transistor 42 is connected, through the resistance 43, to the node N2, and the source is connected, through NMOS transistor 44, to ground potential GND. The node N2 is connected through PMOS transistor 45 to the power supply potential VDD, and is also connected to the power supply potential VDD and to ground potential GND through the capacitors 46a and 46b respectively. The time constant resulting from the resistance 43 and capacitors 46a, 46b is set to approximately the same value as in the integrating portion 30.

Signal S20 is applied to the gates of the NMOS transistor 44 and PMOS transistor 45. The signal SN2 of the node N2 is applied, through the cascade-connected inverters 47 and 48, to the second input of the NAND gate 50 as the signal S40 of the delay clock.

The signal S50 from the NAND gate 50 is applied to the integrating portion 60 and the AND gate 70, and is also inverted by the inverter 80 and supplied, as the internal clock CKI, to the data input portion 1, data processing portion 2, and data output portion 3.

When the signal S50 from the NAND gate 50 rises, the integrating portion 60 integrates this signal S50 with a fixed time constant. When the threshold voltage of the inverter 65 is reached, the integrating portion 60 raises the signal S60 which is a mask delay signal. When the signal S50 falls, the integrating portion 60 immediately lowers the signal S60.

The integrating portion 60 is configured similarly to the integrating portion 30, and has a PMOS transistor 61 and NMOS transistor 62 to the gates of which the signal S50 is applied. The source of the PMOS transistor 61 is connected to the power supply potential VDD, and the drain is connected to the node N3. The source of the NMOS transistor 62 is connected to ground potential GND, and the drain is connected, through the resistance 63, to the node N3. The node N3 is connected, through capacitors 64a and 64b, to the power supply potential VDD and ground potential GND respectively. The signal SN3 of this node N3 is inverted by the inverter 65 and applied to the AND gate 70 as the signal S60. The signal S70 from the AND gate 70 is applied to the second input of the NAND gate 20 as the mask signal. The time constant of the integrating portion 60 is also set to several ns.

Figure 3:
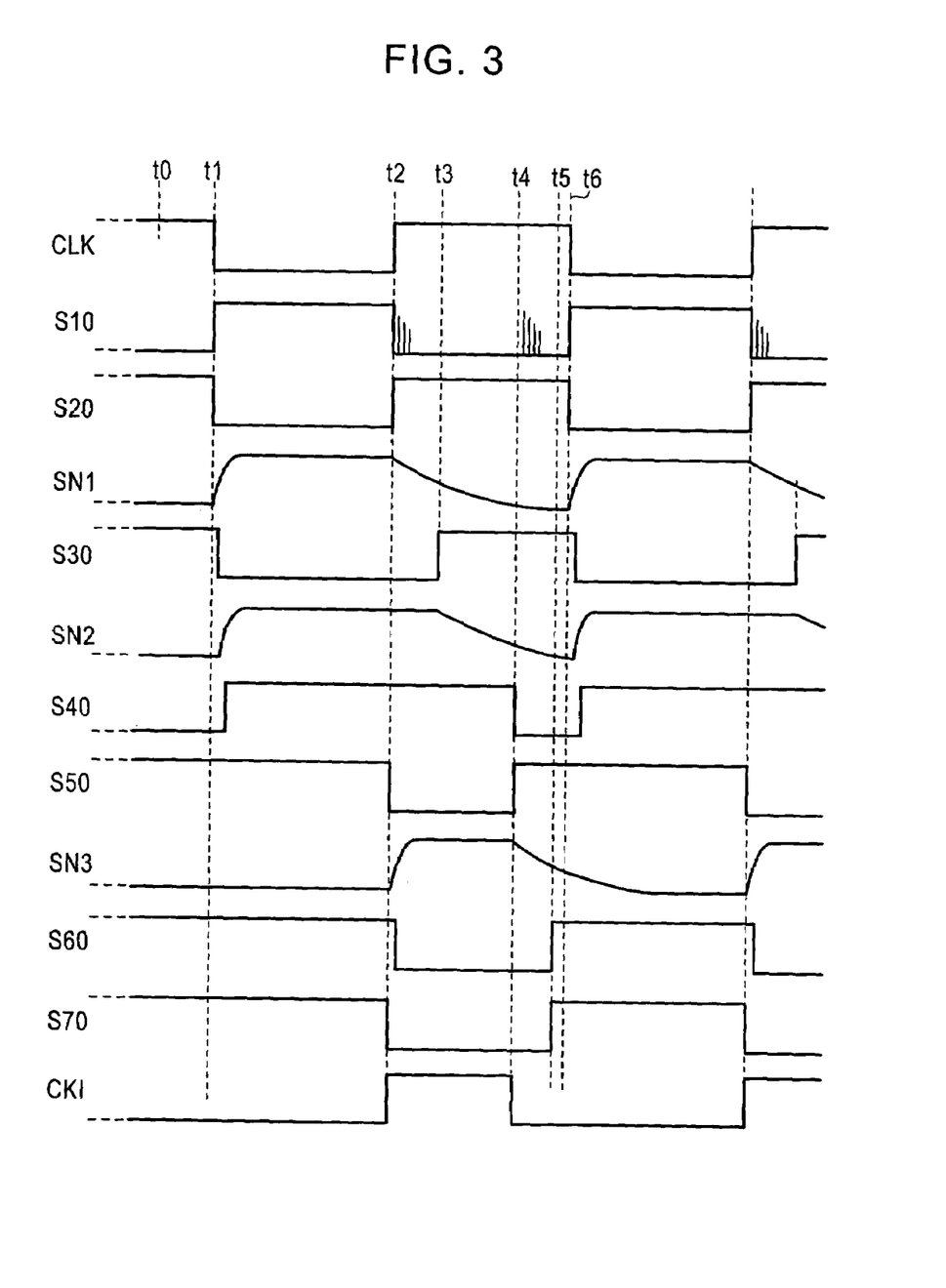
FIG. 3 is a signal waveform diagram showing the operation of the circuitry shown in FIG. 1; and, FIG. 4 illustrates a clock circuit of Embodiment 2 of the present invention.

FIG. 3 is a signal waveform diagram showing the operation of the circuitry shown in FIG. 1. Below, the operation of the clock circuit shown in FIG. 1 is described with reference to FIG. 3.

At time t0 in FIG. 3, when the clock signal CLK provided from outside is fixed at "H", the signal S10 from the buffer portion 10 is "L", and the signal S20 from the NAND gate 20 is "H". The signal SN1 of the node N1 of the integrating portion 20 is "L", and the signal S30 from the integrating portion 30 is "H". The signal SN2 of the node N2 of the integrating portion 40 is "L", and the signal S40 from the integrating portion 40 is "L". Hence the signal S50 from the NAND gate 50 is "H", the signal SN3 of the node N3 of the integrating portion 60 is "L", and the signal S60 from the integrating portion 60 is "H". The signal S70 from the AND gate 70 is "H", and the internal clock CKI is "L".

At time t1, when the clock signal CLK falls from "H" to "L", the signal S10 changes from "L" to "H", and the signal S20 changes from "H" to "L".

When the signal S20 changes to "L", the PMOS transistor 31 and NMOS transistor 32 in the integrating portion 30 are turned on and off respectively. As a result, the capacitor 34b is charged through the turned-on PMOS transistor 31, and the signal SN1 of the node N1 rapidly rises to the power supply potential VDD. When the signal SN1 reaches the threshold voltage of the inverter 35 (VDD/2), the signal S30 changes from "H" to "L".

On the other hand, when the signal S20 changes to "L", the NMOS transistor 44 and PMOS transistor 45 in the integrating portion 40 are turned on and off respectively. When the signal S30 changes to "L", the PMOS transistor 41 and NMOS transistor 42 are turned on and off respectively. Thus, the capacitor 46b is charged through the turned-on PMOS transistor 41, and the signal SN2 of the node N2 rises rapidly to the power supply potential VDD. When the signal SN2 reaches the threshold voltage of the inverter 47 (VDD/2), the signal S40 changes from "L" to "H".

Immediately after time t1, the "L" signals S20 and S40 are applied to the NAND gate 50, so that the signal S50 is "H". After that, even if the signal S40 changes to "H", the signal S50 is held at "H" because the signal S20 is "L". Hence the signals S60 and S70 and the internal clock CKI do not change.

At time t2, when the clock signal CLK rises from "L" to "H", the signal S10 changes from "H" to "L", and the signal S20 changes from "L" to "H".

When the signal S20 changes to "H", the PMOS transistor 31 and NMOS transistor 32 in the integrating portion 30 are turned off and on respectively. As a result, the capacitor 34b is discharged through the turned-on NMOS transistor 32 and resistance 33, and the signal SN1 of the node N1 declines to ground potential GND according to the time constant determined by the capacitors 34a, 34b and resistance 33. However, at this time the signal SN1 is higher than the threshold voltage of the inverter 35, and therefore the signal S30 remains "L".

On the other hand, when the signal S20 changes to "H", the NMOS transistor 44 and PMOS transistor 45 in the integrating portion 40 are turned off and on respectively. Because the signal S30 is "L", the PMOS transistor 41 and NMOS transistor 42 are turned on and off respectively, and the signal S40 is held at "H". The "H" signals S20 and S40 are applied to the NAND gate 50, so that the signal S50 is "L".

When the signal S50 changes to "L", the PMOS transistor 61 and NMOS transistor 62 in the integrating portion 60 are turned on and off respectively. As a result, the capacitor 64b is charged through the turned-on PMOS transistor 61, and the signal SN3 of the node N3 rises rapidly to the power supply potential VDD. When the signal SN3 reaches the threshold voltage of the inverter 65 (VDD/2), the signal S60 changes from "H" to "L". The signal S70 from the AND gate 70 is already "L" when the signal S50 changes to "L". At this time, therefore, there is no change in the signal S70.

When the signal S50 changes to "L" upon rising of the clock signal CLK at time t2, the internal clock CKI changes to "H". As a result, state changes occur in the data input portion 1, data processing portion 2 and data output portion 3. Thus, a rapid change occurs in the power supply current, and noise occurs in the signal S10 generated from the buffer portion 10, due to fluctuations in the substrate potential. However, because the "L" signal S70 is applied to the second input of the NAND gate 20, the signal S20 from this NAND gate 20 is held at "H", without being affected by noise superposed on the signal S10. Hence noise is not superposed on the internal clock CKI.

At time t3 the signal SN1 of the node N1 falls to the threshold voltage of the inverter 35, and the signal S30 changes from "L" to "H". As a result the PMOS transistor 41 and NMOS transistor 42 of the integrating portion 40 are turned off and on respectively. The capacitor 46b is discharged through the turned-on NMOS transistor 42 and resistance 43, and the signal SN2 of the node N2 drops to ground potential GND according to the time constant determined by the capacitors 46a, 46b and resistance 43. However, at this time the signal SN2 is greater than the threshold voltage of the inverter 47, and therefore the signal S40 remains at "H". Hence the signal S50 does not change, and the internal clock CKI also remains at "H".

At time t4, when the signal SN2 of the node N2 falls to the threshold voltage of the inverter 47, the signal S40 changes from "H" to "L", and the signal S50 becomes "H".

When the signal S50 changes to "H", the PMOS transistor 61 and NMOS transistor 62 of the integrating portion 60 are turned off and on respectively. As a result, the capacitor 64b is discharged through the turned-on NMOS transistor 62 and resistance 63, and the signal SN3 of the node N3 declines to ground potential GND according to the time constant determined by the capacitors 64a, 64b and resistance 63. However, at this time the signal SN3 exceeds the threshold voltage of the inverter 65, so that the signal S60 remains at "L".

When the signal S50 changes to "H", the internal clock CKI changes to "L", a state change occurs in the data input portion 1, data processing portion 2 and data output portion 3, and a sudden change occurs in the power supply current. However, because the signal S60 is held in the "L" state, the signal S20 is held at "H", and noise is not superposed onto the internal clock CKI.

At time t5, when the signal SN3 at the node N3 drops to the threshold voltage of the inverter 65, the signal S60 changes from "L" to "H". As a result, the signal S70 supplied from the AND gate 70 changes to "H", but the signal S10 in the buffer portion 10 is "L", so that the signal S20 from the NAND gate 20 is held at "H".

At time t6, when the clock signal CLK falls from "H" to "L", an operation similar to the operation at time t1 occurs. The above operations are repeated as the clock signal CLK rises and falls.

As described above, the semiconductor integrated circuit of this Embodiment 1 has the integrating portions 30 and 40 which begin integration operation with the timing of the rising-edge of the clock signal CLK, and set the internal clock CLI to "H" for a prescribed length of time. Thus, even if rapid fluctuations in the substrate potential occur due to internal operations at the time of the rising edge of the clock signal CLK, the semiconductor integrated circuit of this embodiment can supply a stable internal clock CKI free of noise. Further, the semiconductor integrated circuit of this embodiment has an integrating portion 60 which starts integration operation with the timing of the falling edge of the internal clock CKI to mask the input of the clock signal CLK for a prescribed length of time. Thus, even if sudden fluctuations in the substrate potential occur due to operations at the time of the falling edge of the internal clock CKI, the semiconductor integrated circuit can provide a stable internal clock CKI free of noise.

The integrating circuits of the integrating portions 30, 40, 60 are configured by resistances and capacitors, so that there are less fluctuations in time constants due to temperature and the power supply voltage.

This invention is not limited to the Embodiment 1, and various changes and modifications can be made without departing from the spirit and scope of the invention. The following are examples of such modifications.

(1) The integrating portions 30 and 40 are cascade-connected in the illustrated embodiment. In place of the integrating portion 40, however, an inverter may be provided to invert the output signal of the integrating portion 30.

(2) Although the two integrating portions are cascade-connected in the illustrated embodiment, three or more integrating portions may be cascade-connected.

(3) In cases where noise at the falling edge of the internal clock CKI is not a problem, the integrating portion 60 may be omitted.

Embodiment 2

Figure 4:
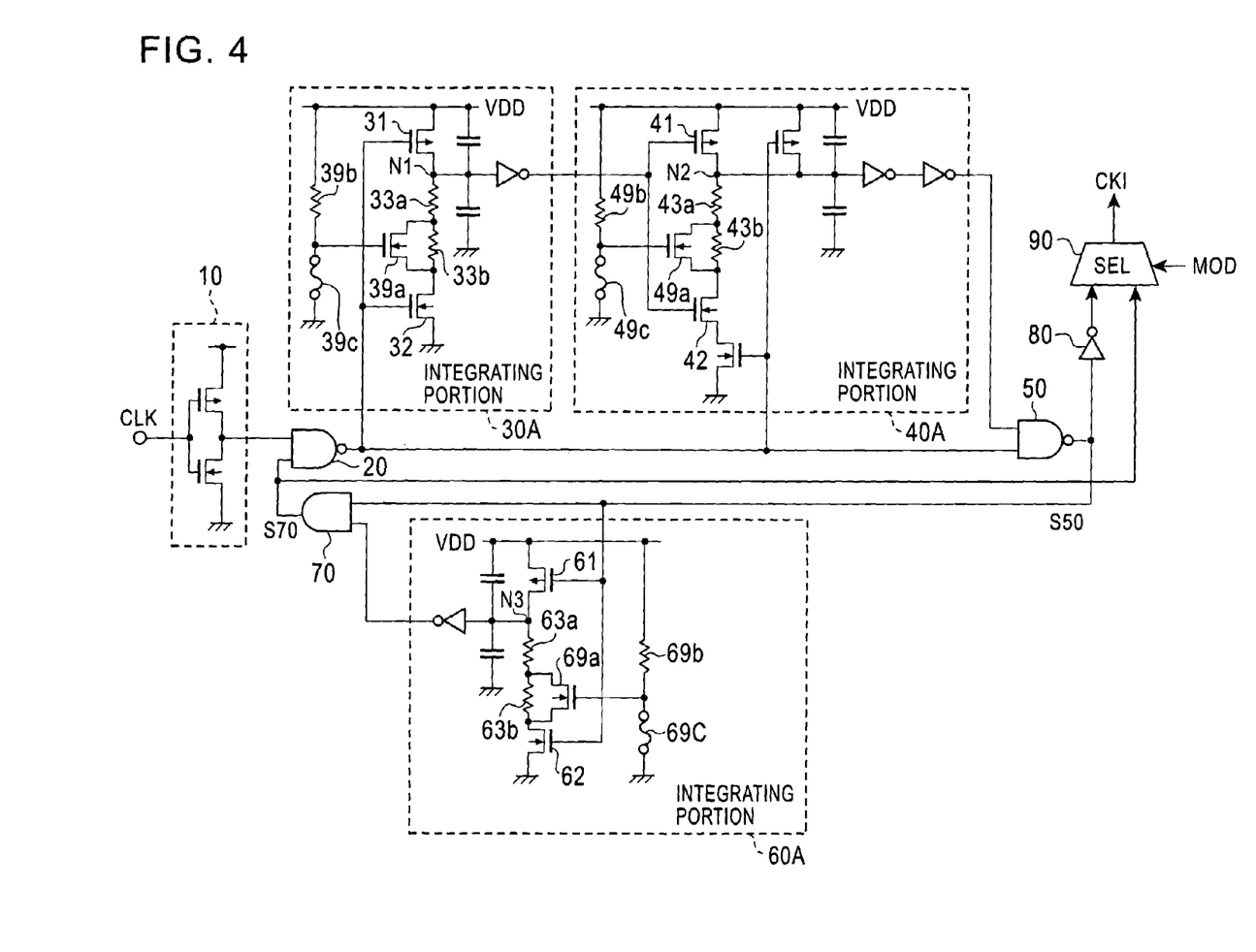

FIG. 4 shows the configuration of the clock circuit of Embodiment 2 of the invention. Similar elements in the Embodiments 1 and 2 are assigned similar symbols.

This clock circuit is used to replace the clock circuit in FIG. 1. In place of the integrating portions 30, 40 and 60, this embodiment has integrating portions 30A, 40A, and 60A, enabling modification of the time constant through the breaking of a fuse. In addition, a selector 90 is provided to switch (select) between the signal S80 and signal S70 in response to a mode signal MOD, and supplies the selected signal as the internal clock CKI.

The integrating portion 30A divides the resistance 33 in the integrating portion 30 into two resistances 33a and 33b, and adds an NMOS transistor 39a to short-circuit the resistance 33b. The integration portion 30A also includes a resistance 39b and fuse 39c to turn on and off the NMOS transistor 39a. Specifically, the source and drain of the NMOS transistor 39a are connected to either end of the resistance 33b, and the gate of the NMOS transistor 39a is connected to a pull-up resistance 39b and pull-down fuse 39c. By breaking the fuse 39c the NMOS transistor 39a is turned on, and the resistance 33b is short-circuited.

Similarly, the integrating portion 40A divides the resistance 43 in the integrating portion 40 into two resistances 43a and 43b, and adds an NMOS transistor 49a to short-circuit the resistance 43b. The integrating portion 40A also has a resistance 49b and fuse 49c to turn on and off the NMOS transistor 49a.

Likewise, the integrating portion 60A divides the resistance 63 in the integrating portion 60 into two resistances 63a and 63b, and adds an NMOS transistor 69a to short-circuit the resistance 63b, and a resistance 69b and fuse 69c to turn on and off the NMOS transistor 69a. Otherwise the configuration is similar to that in FIG. 1.

Next, the method of adjustment of the internal clock in the clock circuit of FIG. 3 is described.

A wafer with fuses 39c, 49c, 69c in the unbroken state is set in a test device. Because the fuses 39c, 49c, 69c are not broken, the gates of the NMOS transistors 39a, 49a, 69a are "L", these NMOS transistors 39a, 49a, 69a are turned off, and the time constants of the integrating portions 30A, 40A, 60A are set to large values.

First, a mode signal MOD is applied from the test device to the selector 90. This mode signal MOD specifies a normal operation. The test device also sends an input signal IN and clock signal CLK for test purposes, to the data input portion 1 and buffer portion 10. Thus, the output timing of the signals OUT from the data output portion 3 is measured. Accordingly, the internal clock CKI described in Embodiment 1 is generated and is supplied to the data input portion 1, data processing portion 2 and data output portion 3. The output signal OUT is issued in synchronization with this internal clock CKI.

Next, the mode signal MOD is used to specify a test operation. As a result, the signal S70 is supplied to the data input portion 1, data processing portion 2 and data output portion 3 as the internal clock CKI, and an output signal OUT is issued in synchronization with this signal S70.

The timing of the rising edge of the signal S70 is delayed by the sum of the delay times of the integrating portions 30A, 40A, 60A from the timing of the rising edge of the clock signal CLK, as shown in FIG. 3. Hence by comparing the timing of the output signal OUT in normal operation and the timing of the output signal in test operation, the sum of the delay times of the integrating portions 30A, 40A, 60A can be measured.

Next, similar tests are performed with one each of the fuses 39c, 49c, 69c of the integrating portions 30A, 40A, 60A broken, and the sums of the delay times with the fuses 39c, 49c, 69c broken and unbroken are measured. Thus, data is collected, which indicates the amount of shortening of the delay time due to breakage of each of the fuses 39c, 49c, 69c.

Then, a product wafer with the fuses 39c, 49c, 69c unbroken is set in a test device, and a mode signal MOD is used to specify test operation. An input signal IN and clock signal CLK for testing are applied to the data input portion 1 and buffer portion 10, and the timing of the output signal OUT supplied from the data output portion 3 is measured. In this manner, the sum of the delay times in the integrating portions 30A, 40A, 60A can be determined for each semiconductor integrated circuit to be tested.

An optimum delay time is determined in advance. Based on the difference with the optimum delay time, the fuses to be broken are decided, and these fuses are broken. Accordingly, the delay times in the integrating portions 30A, 40A, 60A can be set to the optimum values.

As described above, the clock circuit of this Embodiment 2 has integrating portions 30A, 40A, 60A enabling adjustment of the time constant through the breakage of fuses, so that the timing of the internal clock CKI can be adjusted. A selector 90 is also provided to supply, as the internal clock CKI, the signal S70 delayed by the sum of the delay times of the integrating portions 30A, 40A, 60A by means of a mode signal MOD, so that simply by monitoring the output signal OUT the delay time can be measured, and the optimum timing of the internal clock CKI can be set.

The present invention is not limited to the above described Embodiment 2, and various changes and modifications are possible. The following are examples of modifications.

(1) The circuit used to short-circuit the resistance in each of the integrating portions is not limited to that shown in the drawing.

(2) The explanation assumed that fuses cannot be reconnected once they are broken; but fuses may be used which can be broken and connected by a laser repair device.

(3) A configuration may be employed in which, instead of providing a plurality of integrating portions, a single integrating portion is provided. The time constant of the integrating portion can be selected arbitrarily from a plurality of time constants.

(4) At the time of product testing, if a testing device enables direct measurement of the delay time from signals on the wafer, then the selector 90 is unnecessary.

This application is based on a Japanese Patent Application No. 2004-353560 filed on Dec. 7, 2004, and the entire disclosure thereof is incorporated herein by reference.

What is claimed is:

1. A semiconductor integrated circuit, comprising:
an input buffer, which captures a clock signal provided from outside, thereby providing a first output signal;
a first gate, which inputs the first output signal and a mask signal, which executes a logical operation between the first output signal and the mask signal, and which outputs a second output signal, the second output signal being a result of the logical operation;
an integrating portion, which, when the second output signal of said first gate changes from a first logic level to a second logic level, integrates the second output signal with a prescribed time constant, when the second output signal reaches a prescribed level between the first and second logical levels, changes a delay clock from the second logic lever to the first logic level, and when the second output signal changes from the second logic level to the first logic level, changes said delay clock from the first logic level to the second logic level;
a second gate, which inputs the second output signal of said first gate and said delay clock, which executes a logical operation between the second output signal and said delay clock and which outputs a result as said mask signal; and,
an output buffer, which outputs, as an internal clock, the mask signal generated from said second gate.

2. The semiconductor integrated circuit according to claim 1, further comprising:
a data input portion for capturing a plurality of input signals in synchronization with the internal clock;
a data processing portion for processing the plurality of input signals in synchronization with the internal clock; and
a data output portion for outputting a processing result of the data processing portion in synchronization with the internal clock, wherein the internal clock is supplied to the data input portion, data processing portion and data output portion from the output buffer.

3. The semiconductor integrated circuit according to claim 1, wherein the input buffer includes a CMOS inverter.

4. The semiconductor integrated circuit according to claim 1, wherein the integrating portion includes a resistance and a capacitor.

5. The semiconductor integrated circuit according to claim 1, wherein the integrating portion has a fuse to vary a time constant of the integrating portion.

6. A semiconductor integrated circuit, comprising:
an input buffer, which captures and inverts a clock signal provided from outside, thereby providing a first output signal;
a first gate, which inverts a logical product of a mask signal and the first output signal of said input buffer, thereby providing a second output signal;
a first integrating portion, which, when the second output signal of said first gate rises, integrates the second output signal with a first time constant, when the second output signal reaches a first prescribed level, lowers a delay clock, and when the second output signal falls, immediately raises said delay clock;
a second gate, which inverts a logical product of the second output signal of said first gate and said delay clock, thereby providing a third output signal;
a second integrating portion, which, when the third output signal of said second gate rises, integrates the third output signal with a second time constant, when the third output signal reaches a second prescribed level, raises a mask delay signal, and when the third output signal falls, immediately lowers said mask delay signal;
a third gate, which outputs, as said mask signal, a logical product of the third output signal of said second gate and said mask delay signal; and,
an output buffer, which inverts and outputs, as an internal clock, the mask signal generated by said second gate.

7. The semiconductor integrated circuit according to claim 6, wherein said first and second integrating portions each have:
a p-channel MOS transistor, connected between a power supply potential and a first node, such that a conducting state of the p-channel MOS transistor is controlled by an output signal from a previous-stage gate;
a resistance connected between said first node and a second node;
an n-channel MOS transistor, connected between said second node and ground potential, such that a conducting state of the n-channel MOS transistor is controlled by the same signal as that controlling said p-channel MOS transistor;
a first capacitor connected between said first node and the power supply potential;
a second capacitor connected between said first node and the ground potential; and,
an inverter, which inverts and outputs a signal of said first node.

8. The semiconductor integrated circuit according to claim 7, wherein said resistance includes a first and a second resistance element connected in series, and the semiconductor integrated circuit further comprises a transistor for short-circuiting said second resistance element in accordance with a signal applied from a fuse circuit.

9. The semiconductor integrated circuit according to claim 8 further comprising a selector for selecting the internal clock generated from said output buffer or the mask signal generated from said third gate, in accordance with a mode signal provided from outside, and for outputting the selected signal as the internal clock.

10. The semiconductor integrated circuit according to claim 6, wherein the input buffer includes a CMOS inverter.

11. A semiconductor integrated circuit, comprising:
   first means for capturing and inverting a clock signal provided from outside, thereby providing a first output signal;
   second means for inverting a logical product of a mask signal and the first output signal of said first means, thereby providing a second output signal;
   third means for, when the second output signal of said second means rises, integrating the second output signal with a first time constant, when the second output signal reaches a first prescribed level, lowering a delay clock, and when the second output signal falls, immediately raising said delay clock;
   fourth means for inverting a logical product of the second output signal of said second means and said delay clock, thereby providing a third output signal;
   fifth means for, when the third output signal of said fourth means rises, integrating the third output signal with a second time constant, when the third output signal reaches a second prescribed level, raising a mask delay signal, and when the third output signal falls, immediately lowering said mask delay signal;
   sixth means for outputting, as said mask-signal, a logical product of the third output signal of said fourth means and said mask delay signal; and,
   seventh means for inverting and outputting, as an internal clock, the mask signal generated by said fourth means.

12. The semiconductor integrated circuit according to claim 11, wherein each of said third and fifth means has:
   a p-channel MOS transistor, connected between a power supply potential and a first node, such that a conducting state of the p-channel MOS transistor is controlled by an output signal from a previous-stage gate;
   a resistance connected between said first node and a second node;
   an n-channel MOS transistor, connected between said second node and ground potential, such that a conducting state of the n-channel MOS transistor is controlled by the same signal as that controlling said p-channel MOS transistor;
   a first capacitor connected between said first node and the power supply potential;
   a second capacitor connected between said first node and the ground potential; and,
   an inverter for inverting and outputting a signal of said first node.

13. The semiconductor integrated circuit according to claim 12, wherein said resistance includes a first and a second resistance element connected in series, and the semiconductor integrated circuit further comprises eight means for short-circuiting said second resistance element in accordance with a signal applied from a fuse circuit.

14. The semiconductor integrated circuit according to claim 13 further comprising ninth means for selecting the internal clock generated from said seventh means or the mask signal generated from said sixth means, in accordance with a mode signal provided from outside, and for outputting the selected signal as the internal clock.

15. The semiconductor integrated circuit according to claim 11, wherein the input buffer includes a CMOS inverter.

* * * * *